J. P. YOUNG.
DEVICE FOR DESTROYING INSECTS WHICH FLY AT NIGHT.
APPLICATION FILED MAY 22, 1908.
952,659.
Patented Mar. 22, 1910.
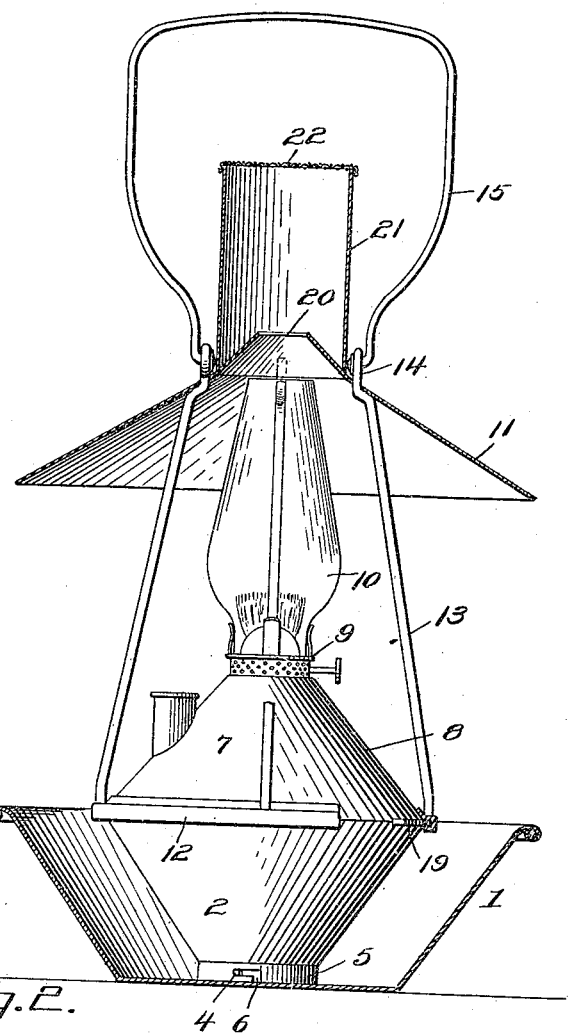
Fig. 1.
Fig. 2.
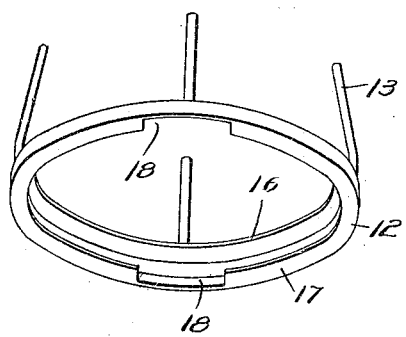
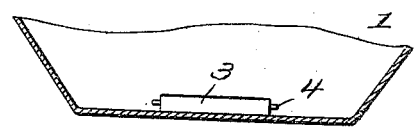
Fig 3
WITNESSES:
F. C. Gibson,
A. D. Hendricks.
INVENTOR
James P. Young.
BY
Jas. H. Vermilya
ATTORNEY

UNITED STATES PATENT OFFICE.

JAMES P. YOUNG, OF HACKLEBURG, ALABAMA.

DEVICE FOR DESTROYING INSECTS WHICH FLY AT NIGHT.

952,659.  Specification of Letters Patent.  Patented Mar. 22, 1910.

Application filed May 22, 1908. Serial No. 434,651.

*To all whom it may concern:*

Be it known that I, JAMES P. YOUNG, of Hackleburg, county of Marion, State of Alabama, have invented a new and useful Improvement in Devices for Destroying Insects which Fly at Night, of which the following is a full, clear, and exact description, reference being had to the accompanying drawings, making part of this specification.

This invention is an improved device for destroying insects which fly by night, and consists in the construction, combination and arrangement of parts herein after described and claimed.

In the accompanying drawings, Figure 1 is partly an elevation and partly a sectional view of an insect destroying device embodying this invention. Fig. 2 is a detail perspective view of the shade-supporting frame. Fig. 3 is a detail sectional view of the base pan.

In the construction of this improved insect destroying device, a base pan 1 is provided, which in practice is partly filled with oil or other liquid material. A lamp 2 is placed in the base pan. The latter is here shown with a boss 3 in the bottom and with studs 4 projecting from the boss, and the lamp is shown provided with a depending supporting flange 5, to receive the boss and which flange has bayonet slots 6 for the reception of the studs, whereby the lamp may be secured to the pan or detached therefrom at will. The lamp is constructed with a frusto-conical upper portion 7, presenting steeply inclined sides 8. The lamp has a suitable burner 9 and a chimney 10.

A shade 11, of frusto-conical form, is provided with a supporting frame, here shown as composed of a base ring 12 to encircle the lamp, at the point of the greatest diameter of the latter, and rods 13, which have their lower ends secured to the base ring and their upper ends attached to the shade, the upper ends of two of the rods also having eyes 14 for the reception of the ends of the bail 15. The base ring has inwardly extending upper and lower flanges 16, 17, and the said lower flange has recesses 18. The lamp has projections 19 at the point of its greatest diameter, which are so located as to register with the recesses 18, and thereby to enter the space between the flanges 16, 17, and coact with said flanges to detachably lock the base ring to the lamp. The shade has a central opening 20, which is directly above the lamp chimney. On the upper side of the shade, at the center thereof, is a cage 21, which is detachable from the shade, and the lower end of which cage is seated between the eyes 14. A screen 22 of wire gauze or other suitable foraminous material is placed at the upper end of the cage and forms the top thereof.

In the operation of the invention, when the lamp is lighted at night, the flying insects, such as tobacco flies, boll weevil and the like, are attracted by the light and in passing upwardly on the chimney are either burned to such an extent as to cause them to drop into the oil in the base pan, which kills them, or are destroyed by the heat and flame and forced by the draft into the cage, through the opening in the center of the shade. The cage, being removable, may be readily cleaned from time to time as necessary.

What I claim as new and desire to secure by Letters Patent is:

In an insect destroying device of the character described, the combination of a base pan, a lamp therein comprising a lower body and an upper shade of truncated conical form and provided with a central opening, rods extending upwardly from said body and through said shade, said rods being offset below the shade to support the same, and coiled thereabove to form bail receiving eyes, and a cylindrical cage loosely disposed upon said shade with its lower open end surrounding the shade opening and confined between said rod eyes to prevent lateral displacement thereof, and having a screen covering its upper open end.

In testimony whereof I have set my hand this 13th day of May, A. D. 1908, in the presence of two attesting witnesses.

JAMES P. YOUNG.

Witnesses:
 CHARLES P. LUNSFORD,
 JAMES W. EVANS.